Feb. 25, 1930.                H. WALKER                 1,748,156
                             SHAFT MOUNTING
                          Filed Jan. 26, 1927         2 Sheets-Sheet 1
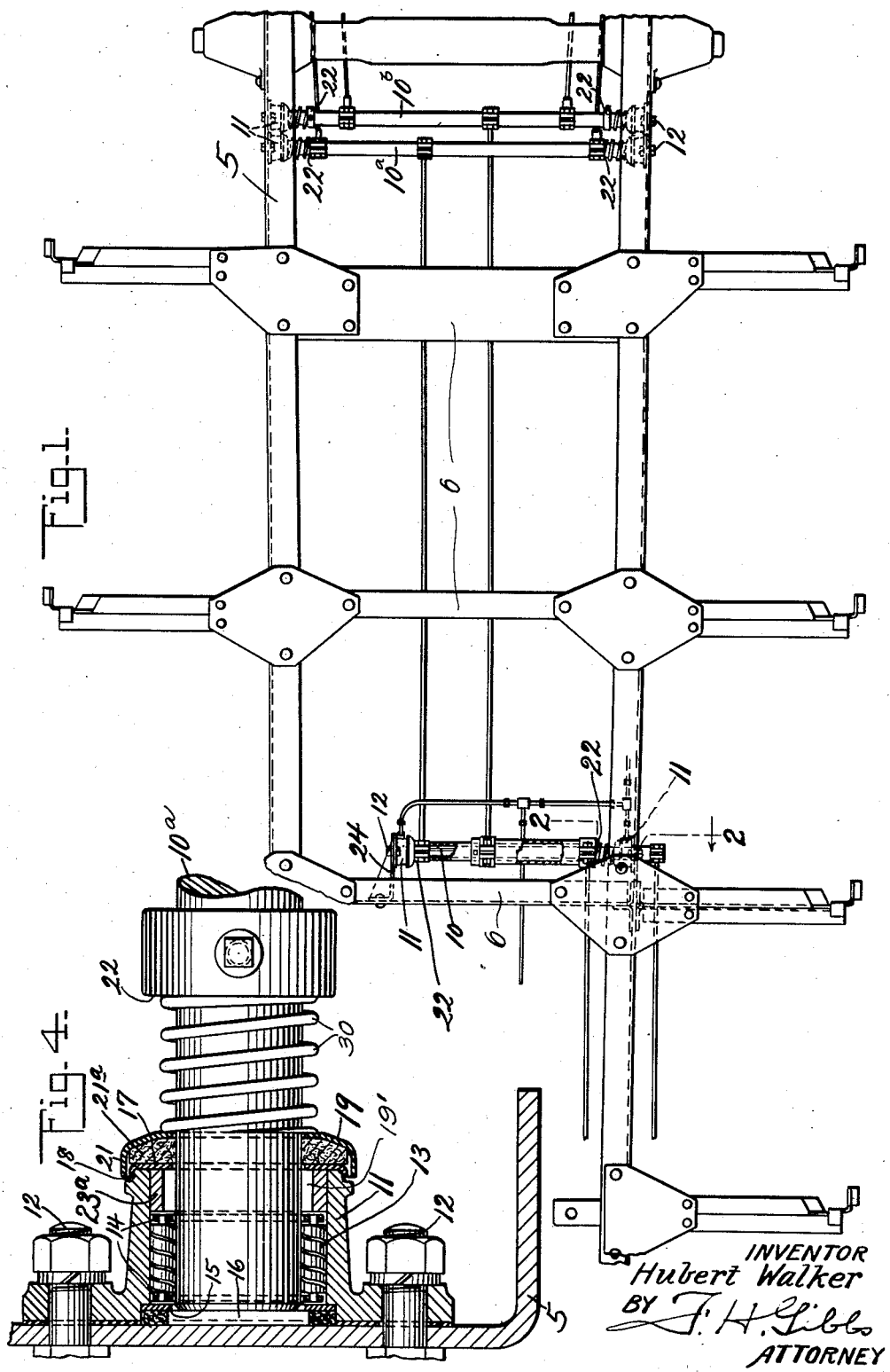
INVENTOR
Hubert Walker
BY F. H. Libb
ATTORNEY

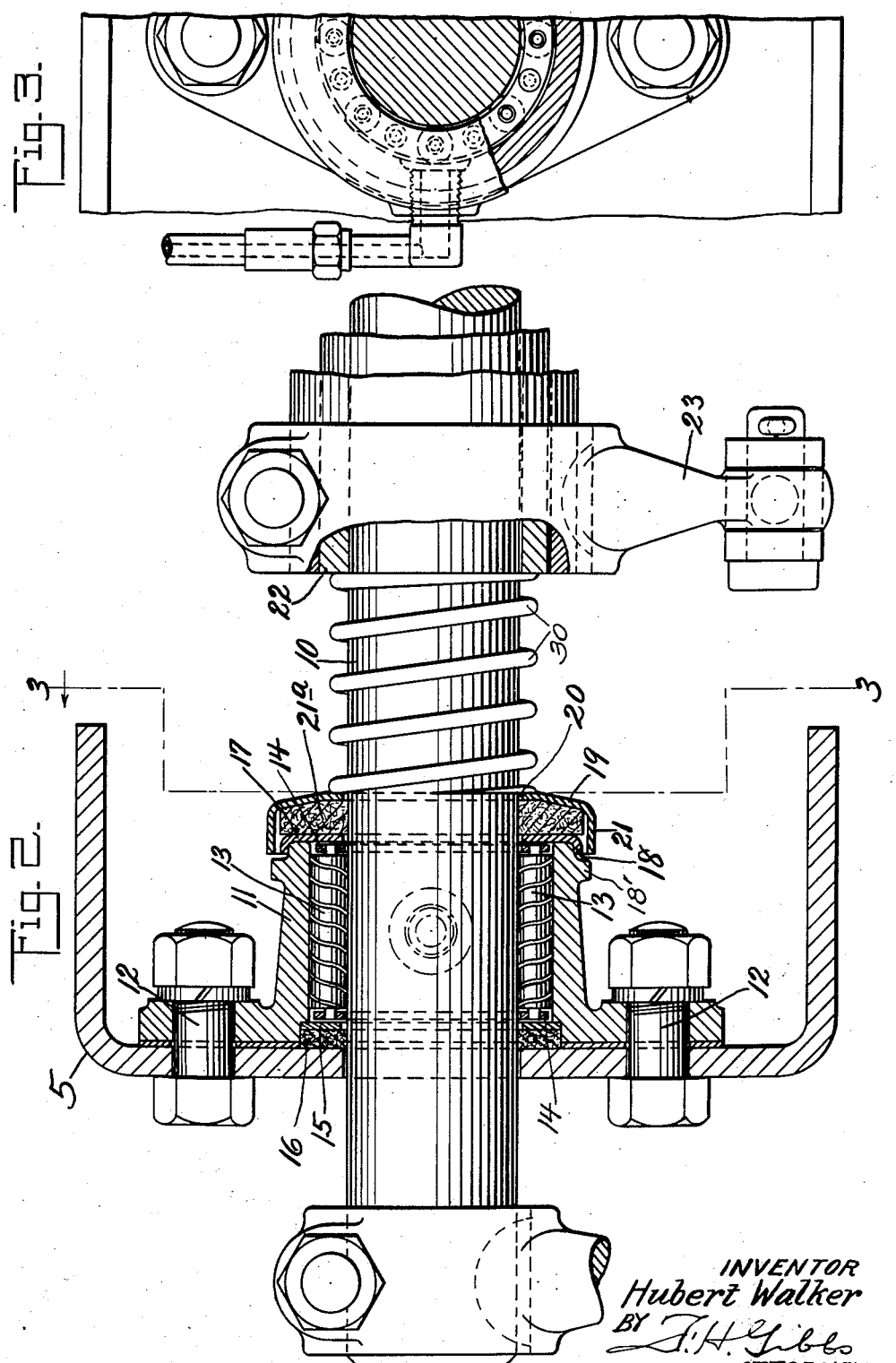

Patented Feb. 25, 1930

1,748,156

UNITED STATES PATENT OFFICE

HUBERT WALKER, OF ROYAL OAK, MICHIGAN, ASSIGNOR TO AMERICAN CAR AND FOUNDRY MOTORS COMPANY, OF NEW YORK, N. Y., A CORPORATION OF DELAWARE

SHAFT MOUNTING

Application filed January 26, 1927. Serial No. 163,699.

Reference is had to the accompanying drawings which illustrate the preferred form of the invention, though it is to be understood that the invention is not limited to the exact details of construction shown and described, as it is obvious that various modifications thereof within the scope of the claim will occur to persons skilled in the art.

In said drawings:

Fig. 1 is a plan view illustrating the application of the invention to a frame or chassis;

Fig. 2 is a longitudinal sectional view of my improved shaft mounting taken on line 2—2 of Fig. 1, and having parts broken away.

Fig. 3 is a vertical sectional view taken on line 3—3 of Fig. 2, and

Fig. 4 is a fragmentary sectional view showing a slightly modified embodiment of the invention.

My invention relates to shaft mountings, and more particularly to a brake or similar shaft mounting.

The invention has as its principal object the provision of a brake or similar shaft mounting wherein the roller bearings are enclosed to retain lubricant therein and to exclude dirt or other foreign matter therefrom.

It is another object of this invention to provide a shaft mounting wherein the journal box may be attached directly to an automobile chassis or frame or bracketed from the latter.

A further object of this invention is to provide a shaft mounting which will compensate for disalinement incident to the springing of the shaft or from other causes.

The invention also contemplates a shaft mounting of this character wherein the number of parts is comparatively small, and at the same time the device is one of durability and is positive in operation.

Referring now, more particularly to the drawings, Fig. 1 shows a chassis frame of the motor vehicle, the same including the side frame members 5 and transverse members 6, said side frame and transverse members being of any desired construction. The hand and foot brake shafts are indicated at $10^a$ and $10^b$ respectively, while 10 indicates generally a master shaft for controlling the shafts $10^a$ and $10^b$; the shaft 10 extending through the web of side frame member 5 as clearly shown.

The invention particularly comprehends means for mounting the shafts 10, $10^a$ and $10^b$, and referring now to Fig. 2, it can be seen that a journal box 11 is provided attached to the side frame member 5 by fastenings 12, the shaft 10 being journaled in said box.

Roller bearings 13 are provided in the journal box and have their ends received in retainer rings 14. A suitable gasket and packing 15 and 16 respectively are interposed between the inner end of the bearing 11 and the web of the channel member of the chassis. Received on the shaft 10 and abutting the outer end of the journal box 11 is a washer 17 provided with an inwardly directed annular flange 18 which embraces the end of the journal box.

A packing retainer 19, in the form of a circular plate or follower, is provided, which is mounted on the shaft 10; the latter extending through an opening 20 in said retainer. This retainer 19 is substantially of cup shape having a flanged portion 21 which is arranged substantially parallel to the flange 18. For limiting the position of the retainer 19, the journal box is provided with a circumferential shoulder 18' adjacent its end. It is apparent that the particular arrangement of parts just described is such that the entrance of foreign matter between the disk 17 and the retainer 19 to the packing $21^a$ is largely eliminated.

Positioned on the shaft 10 and bearing against the hub 22 of a brake lever 23, or a collar, as the case may be, is a coil spring 30, the other end of which contacts with the retainer 19, the spring, therefore, holding the retainer 19, packing $21^a$ and washer 17 in assembled relation preventing the discharge or leakage of lubricant from the bearing, and also preventing the entrance of foreign matter thereinto. Referring now to Fig. 4 which discloses the specific mounting of the shafts $10^a$ and $10^b$, inasmuch as the mountings for these two shafts are identical, a description of one will suffice for both. In this figure, the shaft $10^a$ is mounted and extends between the opposed side frame members 5, and each end is received within a journal box identical in construction with the journal box 11 shown in Fig. 2, and hence also designated as 11. The journal box shown in Fig. 4 is also provided with the washer 17, retainer 19 and spring 30, all similar to these several parts heretofore mentioned with regard to Fig. 2. The box is further provided with a gasket and packing 15 and 16 respectively and with suitable bearings 13 retained in rings 14. In the modification shown in this figure, I provide a spacer $23^a$ in the form of a ring interposed between the washer 17 and the ring 14 and thus define a space 19' for the reception of suitable lubricant.

The drawings disclose the shaft 10 as shorter than the shafts $10^a$ or $10^b$ and for supporting the inner end of the shaft 10 a bracket 24 is provided which is secured to one of the transverse members 6 and to which the journal box 11 is attached.

What is claimed is:

In a device of the character described, a shaft, a support therefor, a journal box connected to said support, roller bearings between the shaft and journal box, a flanged disc closing an end of the journal box, a cup-shaped disc spaced from the first disc, packing interposed between said discs, a stop on said shaft and a coil spring interposed between the stop and cup-shaped disc.

In witness whereof I have hereunto set my hand.

HUBERT WALKER.